(12) United States Patent
Mase

(10) Patent No.: US 9,772,201 B2
(45) Date of Patent: Sep. 26, 2017

(54) ROTATION ANGLE DETECTION DEVICE

(71) Applicant: AISAN KOGYO KABUSHIKI KAISHA, Obu-shi, Aichi-ken (JP)

(72) Inventor: Makoto Mase, Handa (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 46 days.

(21) Appl. No.: 14/718,766

(22) Filed: May 21, 2015

(65) Prior Publication Data

US 2015/0345994 A1 Dec. 3, 2015

(30) Foreign Application Priority Data

May 29, 2014 (JP) .................................. 2014-110940

(51) Int. Cl.
| | |
|---|---|
| *G01D 5/16* | (2006.01) |
| *G01D 11/24* | (2006.01) |
| *G01D 11/30* | (2006.01) |

(52) U.S. Cl.
CPC ............. *G01D 5/16* (2013.01); *G01D 11/245* (2013.01); *G01D 11/30* (2013.01)

(58) Field of Classification Search
None
See application file for complete search history.

(56) References Cited

U.S. PATENT DOCUMENTS

| | | | |
|---|---|---|---|
| 8,981,769 B2 | 3/2015 | Ikeda et al. | |
| 2008/0204007 A1* | 8/2008 | Kim | G01D 11/245 324/207.25 |
| 2012/0038350 A1 | 2/2012 | Bender et al. | |
| 2013/0063137 A1* | 3/2013 | Ikeda | G01B 7/30 324/207.25 |

FOREIGN PATENT DOCUMENTS

| | | |
|---|---|---|
| CN | 102997840 A | 3/2013 |
| JP | H3-209184 A | 9/1991 |

(Continued)

OTHER PUBLICATIONS

Machine English Translation of JP 2008-216044.*

(Continued)

*Primary Examiner* — Jermele M Hollington
*Assistant Examiner* — Douglas X Rodriguez
(74) *Attorney, Agent, or Firm* — Conley Rose, P.C.

(57) ABSTRACT

A rotation angle detection device may include a magnetic detection member that is configured to detect a rotation angle of a rotation member, a holding member holding the magnetic detection member, and a plurality of wiring members for magnetic detection that are attached to the holding member and are connected to the magnetic detection member. The magnetic detection member has a flat plate-shaped body portion, and a plurality of lead terminals. The holding member holds the body portion of the magnetic detection member in a manner that the body portion can longitudinally slide relative to the holding member. The wiring members for magnetic detection respectively have lead terminal connecting portions. The lead terminals of the magnetic detection member are laid on the lead terminal connecting portions of the wiring members for magnetic detection and bonded thereto.

10 Claims, 12 Drawing Sheets

(56) References Cited

FOREIGN PATENT DOCUMENTS

| | | |
|---|---|---|
| JP | H6-51823 U | 7/1994 |
| JP | H10-293006 A | 11/1998 |
| JP | 2003-43074 A | 2/2003 |
| JP | 2003-114138 A | 4/2003 |
| JP | 2007-121109 A | 5/2007 |
| JP | 2008-216044 A | 9/2008 |
| JP | 2009-250629 A | 10/2009 |
| JP | 2012-516434 A | 7/2012 |

OTHER PUBLICATIONS

Japanese Patent Application No. 2014-110940, Notification of Reasons for Refusal dated Apr. 25, 2017 (8 pages).
Chinese Patent Application No. 201510279981.2, First Office Action dated May 3, 2017 (17 pages).

* cited by examiner

ROTATION ANGLE DETECTION DEVICE

CROSS-REFERENCE TO RELATED APPLICATIONS

This application claims benefit of Japanese patent application No. 2014-110940 filed May 29, 2014, the contents of which are hereby incorporated herein by reference in their entirety.

STATEMENT REGARDING FEDERALLY SPONSORED RESEARCH OR DEVELOPMENT

Not applicable.

BACKGROUND

The present disclosure relates to a rotation angle detection device for detecting a rotation angle of a rotation member.

A rotation angle detection device of a rotation member is taught, for example, by JP 2012-516434 A. As shown in FIG. 19, the rotation angle detection device A10 includes a magnetic detection member A12 for detecting a rotation angle of the rotation member, a holding member A13 holding the magnetic detection member A12, and a plurality of wiring members A14 for detection attached to the holding member A13 and connected to the magnetic detection member A12. With reference to mutually orthogonal three axes X, Y and Z (X-axis directions, Y-axis directions, and Z-axis directions) shown in FIG. 19, the magnetic detection member A12 has a plate-shaped main body portion A16 of which the thickness directions corresponds to the Z-axis directions, a plurality of lead terminals A18 projected in a negative direction of the Y-axis directions and positioned parallel to each other.

The plurality of lead terminals A18 of the magnetic detection member A12 are respectively bent into an L-shape such that distal end portions thereof can be extended in a positive direction along the Z-axis direction. The wiring members A14 for detection are positioned in parallel to each other. Further, the wiring members A14 for detection respectively have lead terminal connecting portions A14a extending in the same directions of the distal end portions of the lead terminals A18. The main body portion A16 of the magnetic detection member A12 is disposed on the holding member A13. The holding member A13 has a first positioning portion A21, second positioning portions A22, third positioning portions A23, and fourth positioning portions A24 for positioning the main body portion A16 of the magnetic detection member A12 thereon.

The main body portion A16 is positioned in a positive direction along the Y-axis direction by the first positioning portion A21. The main body portion A16 is positioned in a positive direction along the X-axis direction by the second positioning portion A22. The main body portion A16 is positioned in a negative direction along the X-axis direction by the third positioning portion A23. Further, the main body portion A16 is positioned in the positive direction along the Z-axis direction by crimping or swaging of the fourth positioning portion A24. The distal end portions of the lead terminals A18 of the magnetic detection member A12 are laid on the lead terminal connecting portions A14a in the Y-axis direction and bonded to each other by a welding method.

In the rotation angle detection device A10 thus constructed, the magnetic detection member A12 can be restricted from moving in the positive direction along the Y-axis direction (longitudinal direction) on the holding member A13 by means of the first positioning portion A21 and the fourth positioning portion A24. In addition, the magnetic detection member A12 can be restricted from moving in the negative direction along the Y-axis direction on the holding member A13 by means of welded portions formed between the lead terminals A18 and the lead terminal connecting portions A14a. That is, the magnetic detection member A12 can be constrained along the Y-axis directions. Thus, when the holding member A13 is elongated and contracted in the longitudinal direction by heat, the lead terminals A18 of the magnetic detection member A12 can be elongated and contracted, so that the lead terminals A18 can be stressed repeatedly. In particular, because the lead terminals A18 are bent into the L-shape to form bent portions thereon, the lead terminals A18 can be broken by stress concentrations in the bent portions.

Thus, there is a need in the art for an improved rotation angle detection device.

BRIEF SUMMARY

For example, one aspect of the present disclosure may provide a rotation angle detection device which may include a magnetic detection member that is configured to detect a rotation angle of a rotation member, a holding member holding the magnetic detection member, and a plurality of wiring members for magnetic detection that are attached to the holding member and are connected to the magnetic detection member. The magnetic detection member has a flat plate-shaped body portion, and a plurality of lead terminals that are longitudinally projected from one end portion of the body portion and positioned in parallel. The holding member holds the body portion of the magnetic detection member in a manner that the body portion can longitudinally slide relative to the holding member. The wiring members for magnetic detection respectively have lead terminal connecting portions that are positioned in parallel and extend in the same direction as the lead terminals. The lead terminals of the magnetic detection member are laid on the lead terminal connecting portions of the wiring members for magnetic detection and bonded thereto.

According to the rotation angle detection device, the lead terminals of the magnetic detection member may be laid on the lead terminal connecting portions and the wiring member for magnetic detection and bonded thereto. However, the body portion can longitudinally slide relative to the holding member. That is, the magnetic detection member may be immovably restrained in the holding member only at the bonded portions between the lead terminals and the lead terminal connecting portions. Therefore, when the holding member and the magnetic detection member are longitudinally elongated and contracted by heat, the sensor body of the magnetic detection member can move relative to the holding member. As a result, stresses applied to the lead terminals of the magnetic detection member can be prevented. That is, even when the holding member and the magnetic detection member are longitudinally elongated and contracted by heat, a stress concentration in the lead terminals of the magnetic detection member can be minimized. As a result, a disconnection of the lead terminals of the magnetic detection member can be effectively prevented. This may lead to an increased reliability of the rotation angle detection device. Further, even when the holding member is longitudinally elongated and contracted by heat, the magnetic detection member can be prevented from being displaced, so that a reduction in the detection accuracy of the rotation angle of the rotation member can be prevented.

Other objects, features, and advantages, of the present disclosure will be readily understood after reading the following detailed description together with the accompanying drawings and the claims.

DETAILED DESCRIPTION

Figure 1:
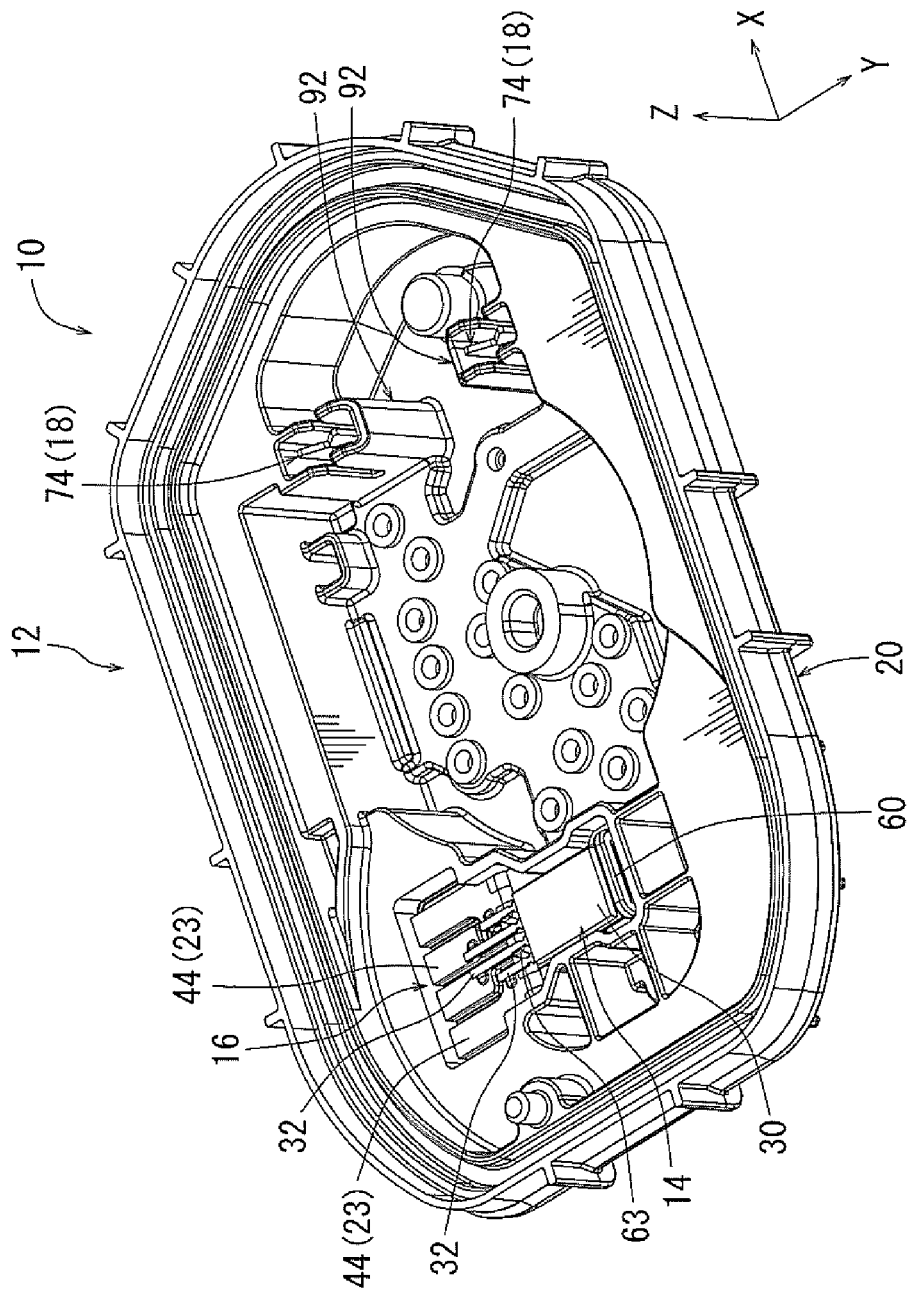
FIG. 1 is a perspective view of a rotation angle detection device (sensor) according to a representative embodiment.

A representative embodiment will now be described with reference to FIGS. 1 to 18.

The present embodiment is directed to a rotation angle detection device (sensor) that is used in an electronically-controlled throttle valve control device (which will be hereinafter simply referred to as a throttle valve control device) of a vehicle, e.g., an automobile. The rotation angle detection device may act as a non-contact throttle position sensor that is capable of detecting a rotation angle of a throttle shaft (a position of a throttle valve) of an engine of the vehicle.

The rotation angle detection device may be attached to a throttle body of the throttle valve control device. The throttle body may have an electric motor for actuating the throttle shaft. The throttle shaft may have a pair of permanent magnets that are configured to cooperate with the rotation angle detection device. Further, the throttle shaft and the electric motor may respectively be referred to herein as a "rotation member" and an "actuator."

In the following description, the X-axis direction, the Y-axis direction, and the Z-axis direction may be defined based on mutually orthogonal three axes X, Y and Z, respectively. As shown in the drawings, the X-axis direction, the Y-axis direction, and the Z-axis direction may respectively correspond to lateral (right and left) directions, longitudinal (front-back) directions, and vertical directions, respectively. In particular, a positive direction along the X-axis direction may correspond to rightward. Conversely, a negative direction along the X-axis direction may correspond to leftward. Further, a positive direction along the Y-axis direction may correspond to forward. Conversely, a negative direction along the Y-axis direction may correspond to backward. Further, a positive direction along the Z-axis direction may correspond to upward. Conversely, a negative direction along the Z-axis direction may correspond to downward. Naturally, the directions thus defined do not limit the scope of the present invention.

Figure 2:
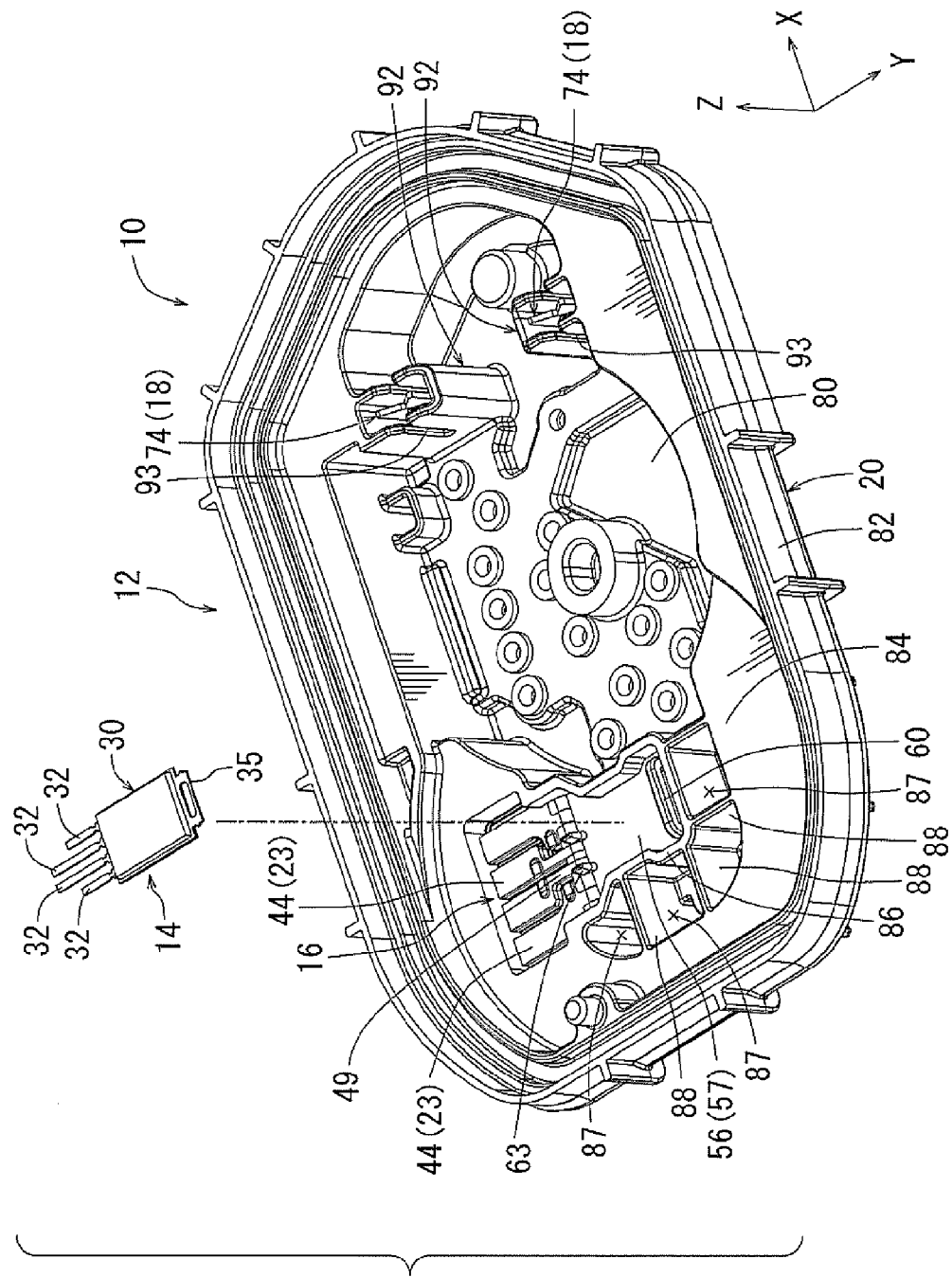
FIG. 2 is an exploded perspective view of the rotation angle detection device, in which a base (a secondary molded article) and a sensor IC are exploded.
Figure 3:
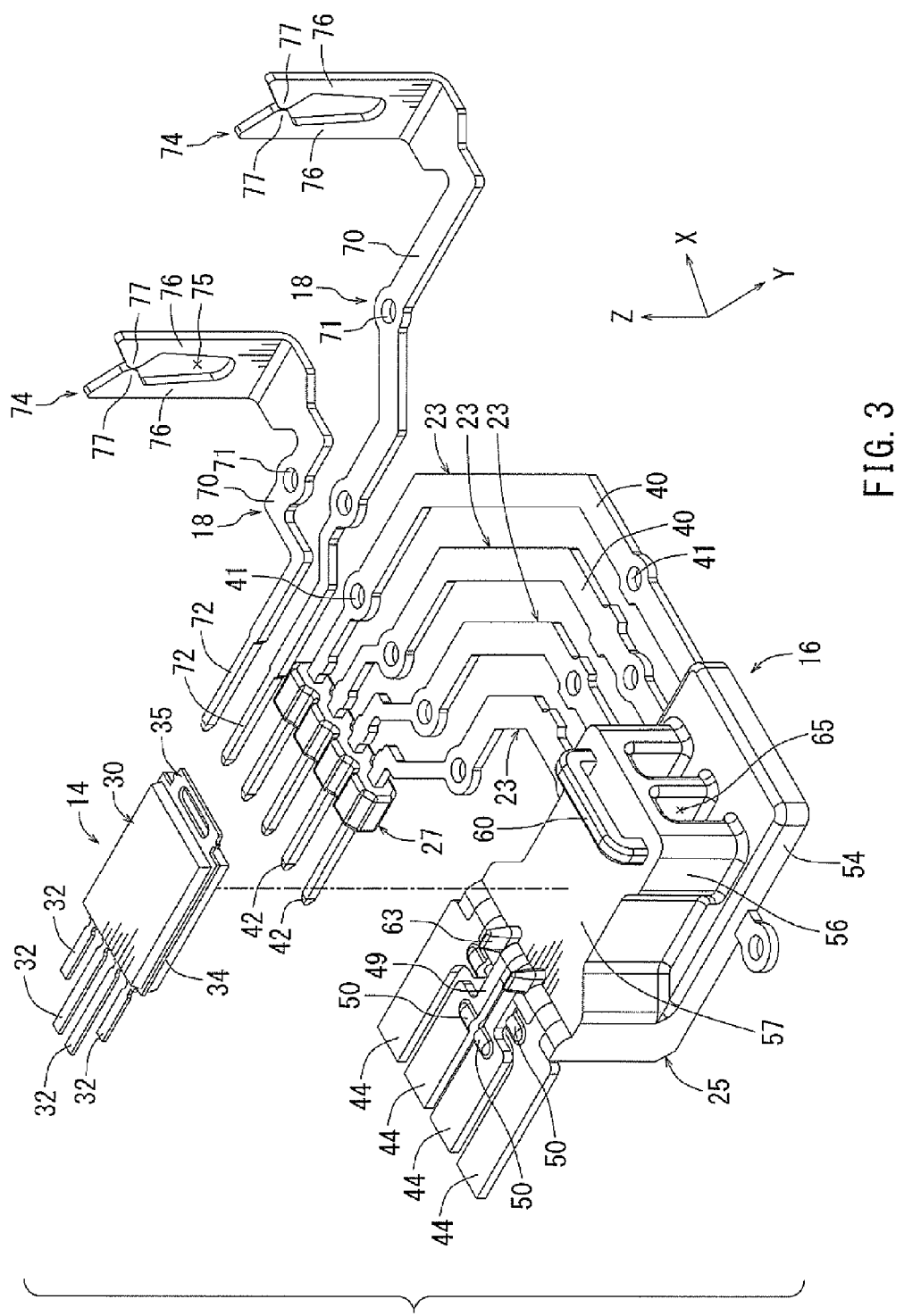
FIG. 3 is a perspective view of a sensor holder (a primary molded article), and the sensor IC and a motor terminal.
Figure 4:
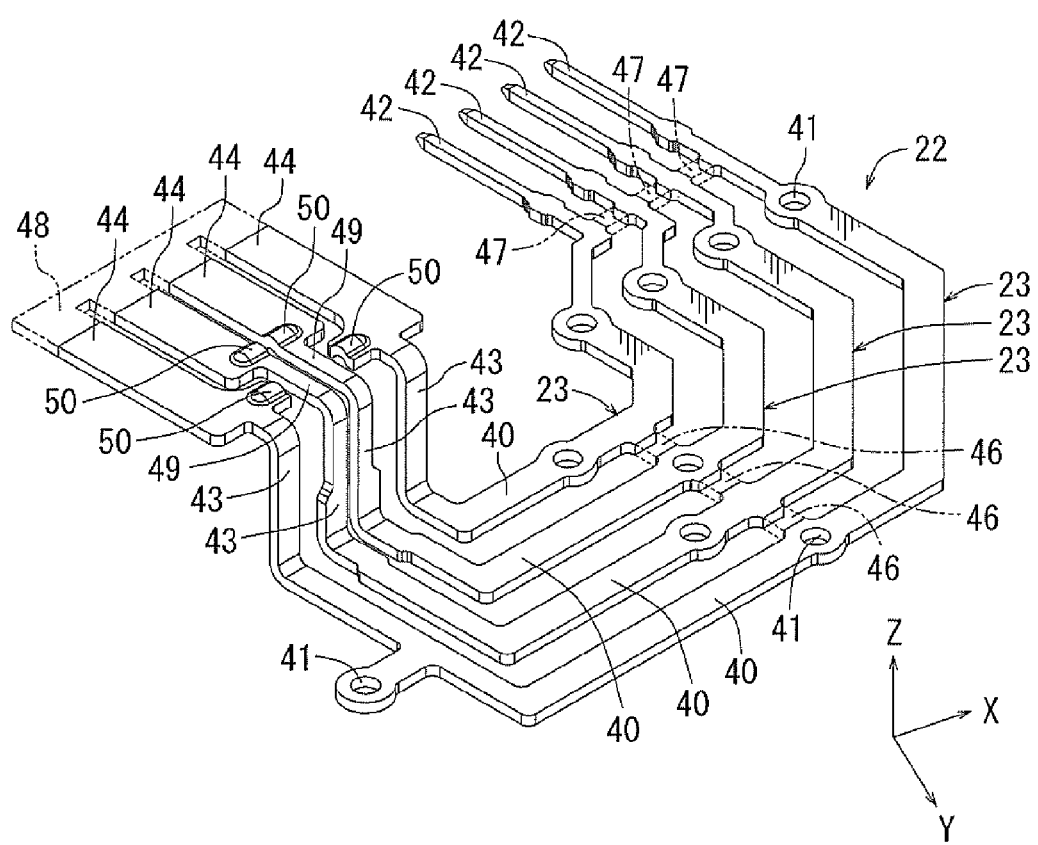
FIG. 4 is a perspective view of a terminal base element.

As shown in FIG. 1, the rotation angle detection device 10 may be composed of a base 12 (a secondary molded article) and a sensor IC 14 (a magnetic detection member). As shown in FIG. 2, the base 12 may be composed of a sensor holder 16 (a primary molded article) and two motor connecting terminals 18 that are integrated with a resin-molded member 20 by an insert molding method (a secondary molding operation). Further, as shown in FIG. 3, the sensor holder 16 may be composed of four sensor terminals 23 separated from each other, a resin-molded support member 25, and a resin-molded connecting member 27. The sensor terminals 23 may be integrated with the support member 25 and the connecting member 27 by an insert molding method (a primary molding operation). In particular, as shown in FIG. 4, the sensor terminals 23 may preferably be produced in the form of a terminal blank 22 (a terminal unit) in which the sensor terminals 23 are integrated with each other via first to third tying portions 46, 47 and 48. The terminal blank 22 of the sensor terminals 23 may be combined with the support member 25 and the connecting member 27 by the insert molding method. Thereafter, the tying portions 46, 47 and 48 may be removed. Thus, the sensor holder 16 having the sensor terminals 23 shown in FIG. 3 may be formed. Further, the support member 25 and the resin-molded member 20 may be referred to herein as a "holding member" or a "resin-molded component" molded with the sensor terminals 23.

Figure 5:
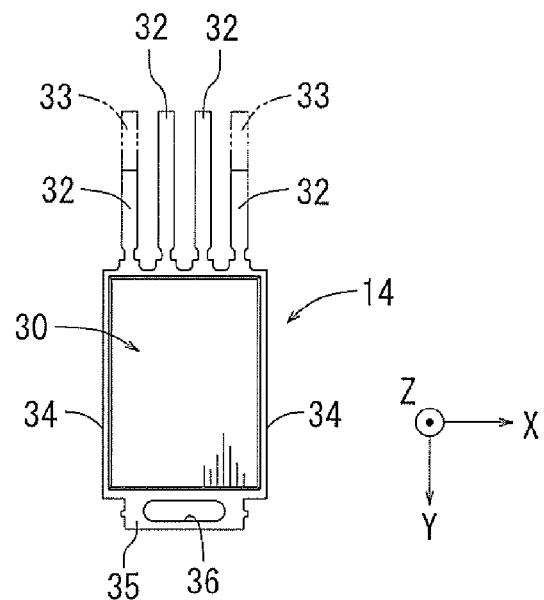
FIG. 5 is a plan view of the sensor IC.

The sensor IC 14 may be a two-output type sensor. As shown in FIG. 5, the sensor IC 14 may have a resin sensor body 30 (a body portion) having a rectangular flat plate shape and a plurality of (four in this embodiment) lead terminals 32 projected from a back end portion (one end portion) of the sensor body 30. Further, the sensor IC 14 may have a set of sensor elements that are respectively molded or embedded in the sensor body 30. The set of elements may include two detection elements (not shown) and two arithmetic elements (not shown) or other such elements. In particular, the detection elements may be ferromagnetic magnetoresistance elements (MRE). Further, the arithmetic elements may be semiconductor integrated circuit elements. As shown in FIG. 2, the sensor IC 14 may be attached to the base 12 in a recumbent position. That is, the sensor IC 14 may be attached to the base 12 such that the widthwise direction, the lengthwise direction, and the thickness direction of the sensor body 30 are respectively directed along the lateral direction (the X-axis direction), the front-back direction (the Y-axis direction), and the vertical direction (the Z-axis direction). Further, a method of attaching the sensor IC 14 to the base 12 may be hereinafter described in detail.

As shown in FIGS. 3 and 5, the sensor body 30 may have flanges 34 that are symmetrically formed in through-thickness central portions of lateral side surfaces thereof. The flanges 34 may project laterally oppositely outward (the X-axis direction) from the lateral side surfaces of the sensor body 30. Further, the flanges 34 may extend linearly in the front-back direction (the Y-axis direction) along the lateral side surfaces of the sensor body 30. Further, the sensor body 30 may have an apertured projection strip 35 that is formed in a front end portion (the other end portion) thereof. In particular, the projection strip 35 may be formed in a through-thickness central portion of a front end surface of the sensor body 30. The projection strip 35 may be projected forward (the positive direction of the Y-axis directions) from the front end surface of the sensor body 30. Further, the projection strip 35 may extend linearly in the lateral direction (the X-axis direction).

The flanges 34 and the projection strip 35 may be made of the same material as the lead terminals 32 and continuously formed as a unit. As shown in FIG. 5, a projection amount of the projection strip 35 projected forward from the front end surface of the sensor body 30 may be greater than a projection amount of the flanges 34 projected laterally from the lateral side surfaces of the sensor body 30. Further, the projection strip 35 may have a laterally elongated oval or oblong aperture 36 formed therein. Further, the projection strip 35 may be referred to herein as "an end portion of the magnetic detection member opposite to the lead terminals."

The lead terminals 32 may be linearly projected backward (the negative direction of the Y-axis direction) from a through-thickness central portion of a back end surface (one end portion) of the sensor body 30. The lead terminals 32 may be positioned in parallel at regular intervals in the lateral direction (the X-axis direction). The lead terminals 32 may preferably be formed from a band plate made of electrically-conductive metals, e.g., copper alloy. The lead terminals 32 may be positioned so as to extend linearly in the front-back direction (the Y-axis direction) while the thickness direction thereof are aligned with the vertical direction (the Z-axis direction). As will be recognized, the lead terminals 32 may be electrically connected to the sensor elements embedded in the sensor body 30. Further, the lead terminals 32 may be positioned so as to be coplanar with the flanges 34 and the projection strip 35.

As shown in FIGS. 2 and 3, the lead terminals 32 may be used in a straight condition without being bent. Further, the right and left (outer two) lead terminals 32 may have a (terminal) length different from a length of the other (inner two) lead terminals 32. In particular, as shown in FIG. 5, the right and left lead terminals 32 may be shortened by removing cutout portions 33 from distal end portions (back end portions) thereof.

Conversely, the sensor terminals 23 of the sensor holder 16 may preferably be formed from a plate-shaped material made of electrically-conductive metals, e.g., a copper alloy such as brass. As shown in FIG. 4 which shows the terminal blank 22, the sensor terminals 23 may respectively be positioned spaced from each other. Further, the sensor terminals 23 may respectively have terminal body portions 40 that are partially embedded in the support member 25 (FIG. 3), external terminal connecting portions 42, and lead terminal connecting portions 44. The terminal body portions 40 may respectively be positioned on a plane perpendicular to the Z-axis at regular intervals. The terminal body portions 40 may respectively have a substantially U-shape in plan. Further, the terminal body portions 40 may respectively be positioned at regular intervals in the front-back direction (the Y-axis direction) so as to form a nested structure in this direction. Further, the terminal body portions 40 may respectively have a certain number of positioning holes 41, so as to be properly positioned on molds (not shown) used in the primary molding operation and the secondary molding operation.

As shown in FIG. 4, the external terminal connecting portions 42 may be formed in end portions (right back end portions) of the U-shaped terminal body portions 40 so as to linearly extend in the front-back direction (the Y-axis direction). The external terminal connecting portions 42 may be positioned in parallel at regular intervals in the lateral direction (the X-axis direction). Conversely, the lead terminal connecting portions 44 may be formed in opposite end portions (left back end portions) of the U-shaped terminal body portions 40 via angled or vertical (connecting) portions 43 so as to linearly extend in the front-back direction (the Y-axis direction). The lead terminal connecting portions 44 may be positioned in parallel at regular intervals in the lateral direction (the X-axis direction). In particular, the vertical portions 43 may respectively connect the opposite end portions of the terminal body portions 40 and proximal end portions (front end portions) of the lead terminal connecting portions 44. Further, the vertical portions 43 may respectively bent into a Z-shape. Thus, the lead terminal connecting portions 44 may respectively be positioned higher than the terminal body portions 40. Further, the external terminal connecting portions 42 and the lead terminal connecting portions 44 may preferably be covered by plated layers of tin, nickel or other such metals.

As shown in FIG. 4, in the terminal blank 22, the sensor terminals 23 may respectively be positioned spaced from each other. The first tying portions 46 may be formed in central portions of the terminal body portions 40 so as to connect the same in the front-back direction (the Y-axis direction). The second tying portions 47 may be formed in the right back end portions of the terminal body portions 40 so as to connect the same in the lateral direction (the X-axis direction). Further, the third tying portion 48 may be continuously formed in distal end portions (back end portions) of the lead terminal connecting portions 44.

As will be appreciated, the terminal blank 22 may preferably be formed from the band plate-shaped material by press forming. Further, the first to third tying portions 46, 47, and 48 formed in the terminal blank 22 may be removed by trimming or punching after the primary molding operation is completed, i.e., after the terminal blank 22 (the sensor terminals 23) is combined with the support member 25 and the connecting member 27 by the insert molding method, which will be hereinafter described. Thus, as shown in FIG. 3, the sensor holder 16 having the sensor terminals 23 that are electrically isolated from each other may be formed.

Further, the sensor terminals 23 may respectively be used as specific terminals. For example, in this embodiment, the front sensor terminal 23 and the back sensor terminal 23 of the centrally-positioned two sensor terminals 23 may respectively used as a power supply terminal and an earth (i.e., ground) terminal, respectively. Conversely, the back sensor terminal 23 and the front sensor terminal 23 of the remaining two sensor terminals 23 may respectively be used as signal output terminals. Further, the sensor terminals 23 may be referred to herein as "wiring members for magnetic detection."

Figure 6:
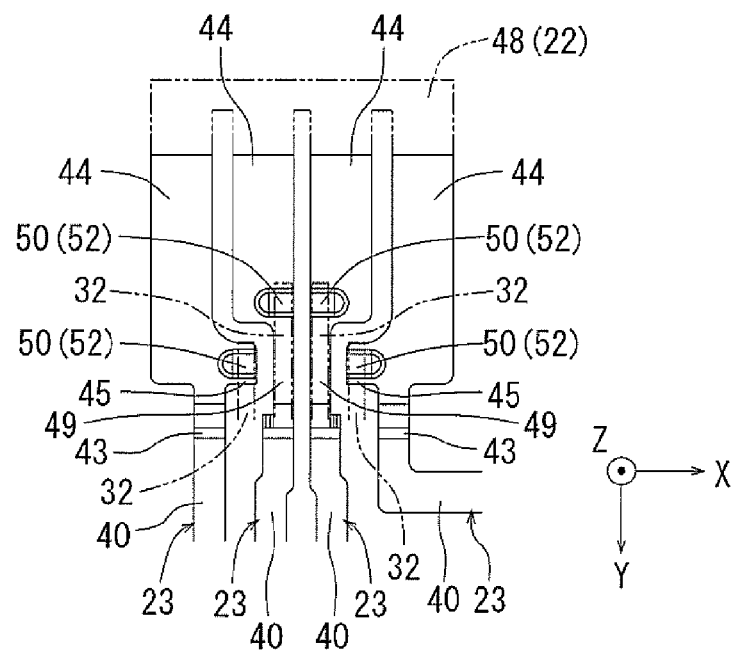
FIG. 6 is a plan view of lead terminal connecting portions of sensor terminals.

As shown in FIGS. 4 and 6, the lead terminal connecting portions 44 of the sensor terminals 23 may have a flat plate shape. The lead terminal connecting portions 44 may be positioned so as to extend linearly in the front-back direction (the Y-axis direction) while thickness directions thereof are aligned with the vertical direction (the Z-axis direction). The centrally-positioned two lead terminal connecting portions 44 may respectively have inwardly-narrowed narrow portions 49 that are formed in the proximal end portions thereof. The narrow portions 49 may be formed along inner sides of lead terminal connecting portions 44 and continuous with the vertical portions 43. Further, the lead terminal connecting portions 44 may have a width (a dimension in the X-axis direction) greater than a width of other portions (i.e., the terminal body portions 40, the external terminal connecting portions 42, the vertical portions 43, and the narrowed portions 49) of the sensor terminals 23. In addition, the width of the lead terminal connecting portions 44 may be greater than a width of the lead terminals 32 of the sensor IC 14 (FIG. 3).

As shown in FIG. 6, the lead terminal connecting portions 44 of the sensor terminals 23 may be configured to extend backward (the negative direction of the Y-axis direction) beyond the distal end portions of the lead terminals 32 of the sensor IC 14 when the sensor IC 14 is attached to the base 12 (FIG. 1). Further, the lead terminal connecting portions 44 may respectively have upwardly-projected projections 50 that are formed in the proximal end portions thereof. The projections 50 may be positioned so as to correspond to the distal end portions of the lead terminals 32 of the sensor IC 14 when the sensor IC 14 is attached to the base 12. Further, the remaining or laterally-positioned two lead terminal connecting portions 44 may respectively have inwardly-widened wide portions 45 that are formed in the proximal end portions thereof. The wide portions 45 may be formed along inner sides of lead terminal connecting portions 44. In the laterally-positioned lead terminal connecting portions 44, the projections 50 may be formed in the wide portions 45 thereof.

Figure 11:
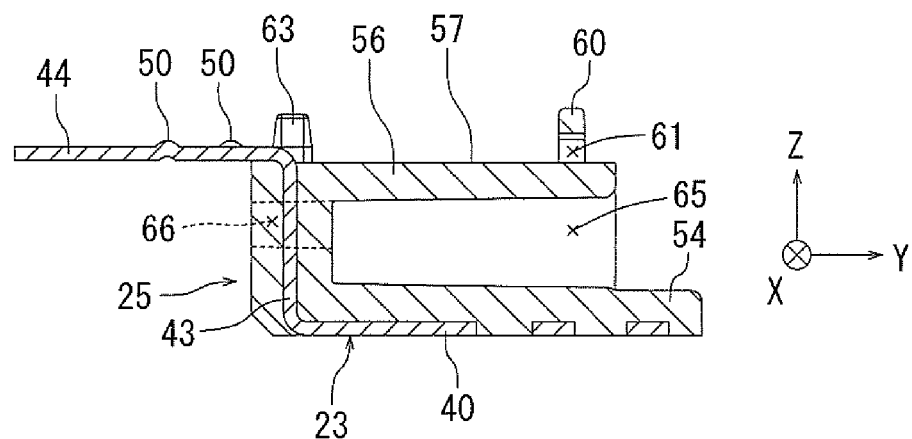
FIG. 11 is a sectional view taken along line XI-XI of FIG. 7.

As will be apparent from FIG. 6, the projections 50 formed in the remaining two lead terminal connecting portions 44 may be separated from the projections 50 formed in the centrally-positioned two lead terminal connecting portions 44 in the forward direction (the positive direction of the Y-axis direction). Further, the projections 50 may preferably have a substantially half-columnar shape (FIG. 11). The projections 50 thus shaped may be positioned such that ridge lines thereof are aligned with the lateral direction (the X-axis direction). Moreover, the left two lead terminal connecting portions 44 and the right two lead terminal connecting portions 44 may preferably be positioned symmetrically. Further, the distal (back) end portions of the lead terminals 32 of the sensor IC 14 may respectively be bonded or welded to the projections 50 after the sensor IC 14 is attached to the base 12, so as to form welded portions 52 (bonded portions).

As previously described, the sensor terminals 23 may be integrated with the support member 25 and the connecting member 27 by the insert molding method (the primary molding operation), so that the sensor holder 16 having the sensor terminals 23 may be formed (FIG. 3). In particular, the terminal blank 22 may be combined with the support member 25 and the connecting member 27 by the insert molding method. Thereafter, the first to third tying portions 46, 47 and 48 may be removed by trimming or punching. As a result, the sensor holder 16 may be formed.

As shown in FIG. 3, the support member 25 may be formed into a thickened block. The sensor terminals 23 may be integrated with the support member 25 while left angled portions of the terminal body portions 40 and the vertical portions 43 (FIG. 4) are embedded therein. Conversely, the connecting member 27 may be formed into a bar-shaped block that extends in the lateral direction (the X-axis direction). The sensor terminals 23 may be integrated with the connecting member 27 while proximal end portions of external terminal connecting portions 42 are embedded therein. Thus, the sensor terminals 23 may be combined with each other via the support member 25 and the connecting member 27 while they are electrically isolated from each other. The support member 25 and the connecting member 27 may function to secure the sensor terminals 23 so as to prevent the same from being separated from each other.

Figure 7:
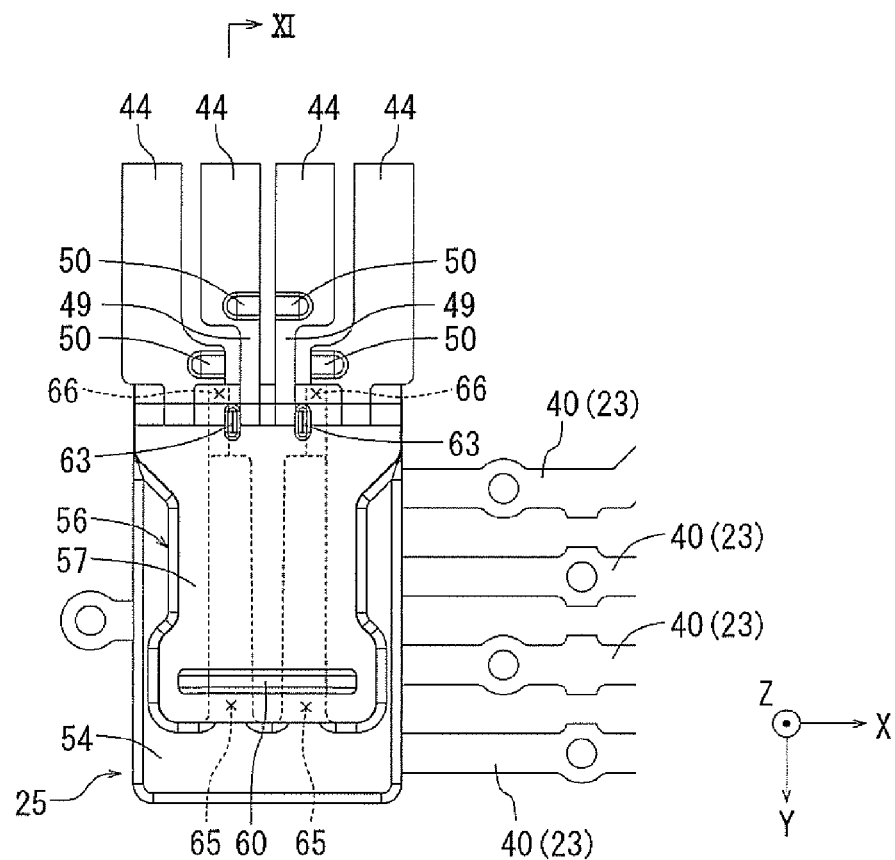
FIG. 7 is a plan view of the sensor holder.

Next, the support member 25 will be described in detail. As shown in FIGS. 3 and 7-11, the support member 25 may have a substrate portion 54 and a support portion 56 (an attaching portion) positioned on the substrate portion 54. The substrate portion 54 may be a rectangular plate-shaped member that is elongated in the front-back direction (the Y-axis direction). Conversely, the support portion 56 may a substantially rectangular parallelepiped member. As shown in FIG. 9, a back end surface of the support portion 56 may be flush with a back end surface of the substrate portion 54. As shown in FIG. 7, the support portion 56 may have a longitudinal length (a dimension in the front-back direction) smaller than a longitudinal length of the substrate portion 54. Further, the support portion 56 may substantially have a width (a dimension in the lateral direction) smaller than a width of the substrate portion 54. However, a back portion of the support portion 56 may have the same width of the substrate portion 54.

As shown in FIG. 3, the left angled portions of the terminal body portions 40 of the sensor terminals 23 may be embedded in the substrate portion 54. Conversely, the vertical portions 43 of the sensor terminals 23 may be embedded in a back portion of the substrate portion 54 and the back portion of the support portion 56. Further, as shown in FIGS. 8-11, the terminal body portions 40 of the sensor terminals 23 may be positioned such that lower surfaces thereof are flush with a lower surface of the support member 25 (the substrate portion 54). Further, upper end portions of the vertical portions 43 may be partially exposed at an upper periphery of the back portion of the support portion 56.

As shown in FIGS. 3, 7 and 11, the support portion 56 may have a flat (horizontal) attaching surface 57 that is formed on an upper surface thereof. Further, the attaching surface 57 may be formed so as to be perpendicular to the Z-axis. The attaching surface 57 may be configured such that the sensor body 30 of the sensor IC 14 is disposed thereon in the recumbent position.

As shown in FIGS. 3 and 7-11, the support portion 56 may have an inverted U-shaped positioning frame 60 (a first positioning portion) that is integrally formed in a front portion of the attaching surface 57. The positioning frame 60 may be positioned so as to extend in the lateral direction (the X-axis direction). The positioning frame 60 may have an engagement opening 61 formed therein. The engagement opening 61 may pass through the positioning frame 60 in the front-back direction (the Y-axis direction) and extend in the lateral direction (the X-axis direction). The engagement opening 61 may be configured to slidably receive the projection strip 35 formed in the sensor body 30 of the sensor IC 14 (FIG. 3) while the projection strip 35 may slide or move in the front-back direction (the Y-axis direction).

As shown in FIGS. 3 and 7-11, the support portion 56 may have a pair of positioning projections 63 (second positioning portions) that are integrally formed in a back portion of the attaching surface 57. Each of the positioning projections 63 may have an elliptical columnar shape that is widened in the front-back direction (the Y-axis direction). Further, the positioning projections 63 may be tapered upward. The positioning projections 63 may respectively be positioned between the left two lead terminals 32 of the sensor IC 14 and between the right two lead terminals 32 of the sensor IC 14 so as to allow the lead terminals 32 to slide or move in the front-back direction (the Y-axis direction).

Figure 8:
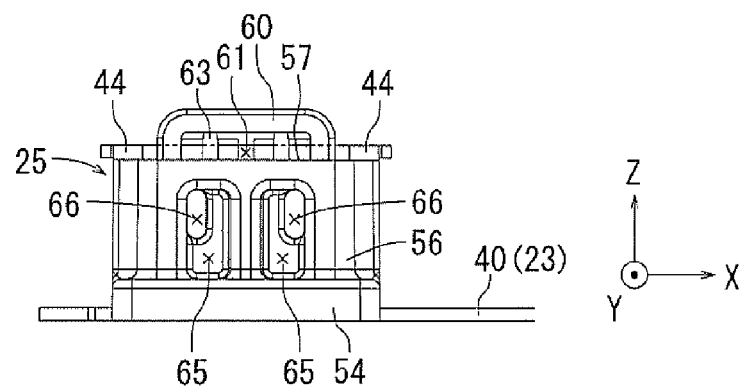
FIG. 8 is an elevation view of the sensor holder.
Figure 9:
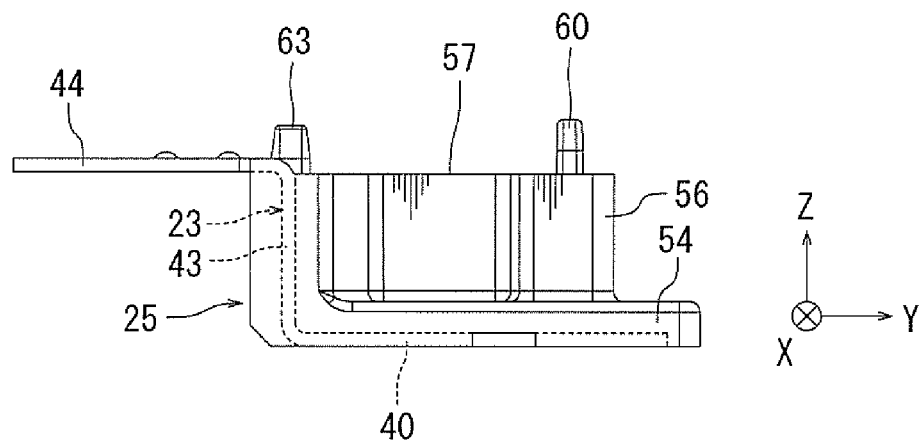
FIG. 9 is a side view of the sensor holder.
Figure 10:
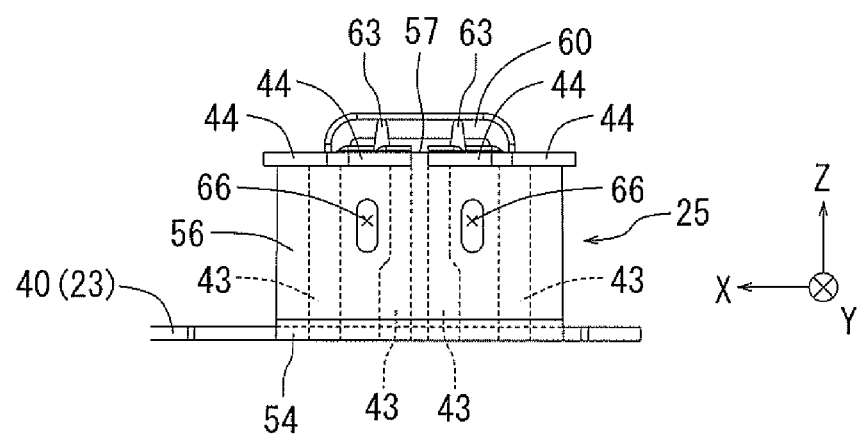
FIG. 10 is a rear elevation view of the sensor holder.

As shown in FIGS. 3, 8 and 11, the support portion 56 may have a pair of horizontal bottomed hollow portions 65 that are laterally formed therein. The hollow portions 65 may open in a front surface of the support portion 56. Further, as shown in FIG. 10, the back portion of the support portion 56 may have a pair of through holes 66 formed therein and communicated with the hollow portions 65. The through holes 66 may be positioned between the vertical portions 43 of the sensor terminals 23 so as to not interfere with the vertical portions 43. Further, the hollow portions 65 and the through holes 66 may be referred to as a "lightening portion."

As shown in FIG. 3, the two motor connecting terminals 18 to be integrated with the resin-molded member 20 with the sensor holder 16 by the insert molding method (the secondary molding operation) may preferably be formed from a plate-shaped material made of electrically-conductive metals, e.g., copper alloy such as phosphor bronze. The motor connecting terminals 18 may be juxtaposed to each other at regular intervals and positioned on the right of the four sensor terminals 23 at regular intervals. The motor connecting terminals 18 may respectively have terminal body portions 70, external terminal connecting portions 72, and motor terminal connecting portions 74. The terminal body portions 70 may respectively be positioned so as to extend in the front-back direction (the Y-axis direction). The terminal body portions 70 may be positioned on the same plane as the terminal body portions 40 of the sensor terminals 23. The terminal body portions 70 may respectively have different lengths. That is, the right terminal body portion 70 may have a length shorter than a length of the left terminal body portion 70. Further, the terminal body portions 70 may respectively have a certain number of positioning holes 71, so as to be properly positioned on the mold (not shown) used in the secondary molding operation.

As shown in FIG. 3, the external terminal connecting portions 72 may be formed in end portions (back end portions) of the terminal body portions 70 so as to linearly extend in the front-back direction (the Y-axis direction). The external terminal connecting portions 72 may be juxtaposed to the external terminal connecting portions 42 of the sensor terminals 23 and positioned in parallel at regular intervals in the lateral direction (the X-axis direction). Conversely, the motor terminal connecting portions 74 may be formed in opposite end portions (front end portions) of the terminal body portions 70. The motor terminal connecting portions 74 may be positioned in parallel at regular intervals in the front-back direction (the Y-axis direction). The motor terminal connecting portions 74 may respectively have the same shape.

The motor terminal connecting portions 74 may respectively be vertical portions that are formed by bending the opposite ends of the terminal body portions 70 upward. The motor terminal connecting portions 74 may respectively have a flat plate shape. As shown in FIG. 3, the motor terminal connecting portions 74 may be positioned such that thickness directions thereof are aligned with the lateral direction (the X-axis direction) while width directions thereof are aligned with the front-back direction (the Y-axis direction). In addition, the motor terminal connecting portions 74 may be positioned so as to be coplanar with each other in the front-back direction.

Figure 12:
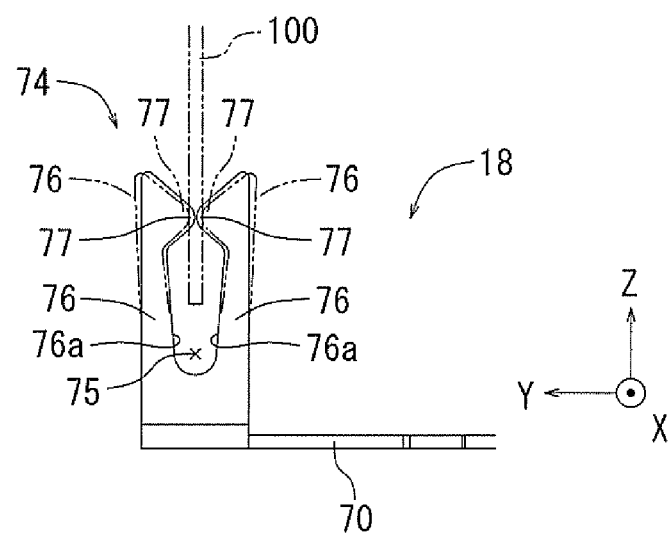
FIG. 12 is a side view of motor terminal connecting portions of the motor terminals.

As shown in FIGS. 3 and 12, the motor terminal connecting portions 74 may respectively have expanding slots 75 that open on upper ends thereof. As a result, each of the motor terminal connecting portions 74 may respectively have a substantially U-shape and have a pair of elastic clamping strips 76 oppositely positioned across each of the expanding slots 75. As shown by solid lines and broken lines in FIG. 12, the clamping strips 76 may be configured to be elastically flexed in their widthwise direction (the Y-axis direction). Further, the clamping strips 76 of each of the motor terminal connecting portions 74 may have wedge-shaped clamping projections 77 that are inwardly oppositely projected from distal (upper) end portions thereof. As shown in FIG. 12, the clamping strips 76 may respectively be reduced in width toward the distal (upper) end portions thereof. In particular, in each of the motor terminal connecting portions 74, the expanding slot 75 may be gradually widened upwardly (along the Z-axis direction) such that opposite inner side surfaces 76a of the clamping strips 76 are inclined outward and upward. Further, the clamping strips 76 of each of the motor terminal connecting portions 74 may preferably be formed symmetrically.

The two motor connecting terminals 18 may respectively be used as specific terminals. For example, in this embodiment, the motor terminal 18 having the short terminal body portion 70 may be used as a plus terminal of an electric motor (not shown). Conversely, the motor terminal 18 having the long terminal body portion 70 may be used as a minus terminal of the motor. Further, the motor connecting terminals 18 may be referred to herein as "actuator connection wiring members" or "electric motor connection wiring members." Further, the motor terminal connecting portions 74 may be referred to as "actuator terminal connecting portions."

As previously described, the sensor holder 16 (the primary molded article) and the two motor connecting terminals 18 may be integrated with the resin-molded member 20 by the insert molding method (the secondary molding operation), so as to form the base 12 (the secondary molded article). As shown in FIG. 2, the resin-molded member 20 may have a tray-shaped component having an upper opening. In particular, the resin-molded member 20 may have a flat plate-shaped portion 80 and an annular wall portion 82 extending along a circumference of the plate-shaped portion 80. The sensor holder 16 and the motor connecting terminals 18 may be embedded in the plate-shaped portion 80.

Figure 14:
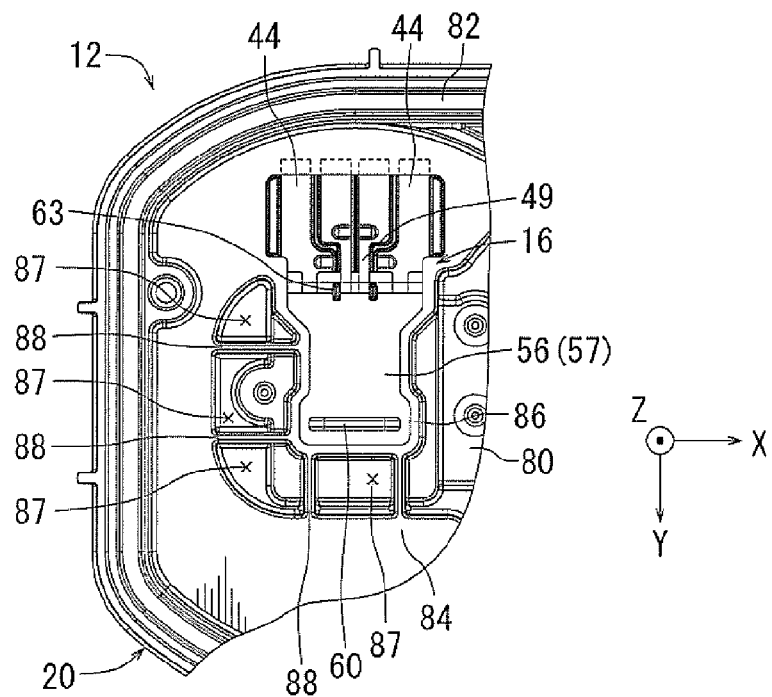
FIG. 14 is a partially plan view of the base.

As shown in FIGS. 2 and 14, the resin-molded member 20 may include a support wall portion 84 that is formed in a left end portion of the plate-shaped portion 80. The support wall portion 84 may have a horizontal top surface which is positioned above the level of a top surface of the plate-shaped portion 80. A substantial portion of the sensor holder 16 may be embedded in the support wall portion 84 while the attaching surface 57 formed in the support portion 56 of the support member 25, the positioning frame 60 and the positioning projections 63 formed in the attaching surface 57, and the lead terminal connecting portions 44 (including the inwardly-narrowed narrow portions 49) of the sensor terminals 23 are exposed. Further, the attaching surface 57 formed in the support portion 56 and upper surfaces of the lead terminal connecting portions 44 (including the inwardly-narrowed narrow portions 49) may be positioned below the level of the top surface of the support wall portion 84. That is, the support wall portion 84 may have a surrounding wall 86 that surrounds the attaching surface 57 formed in the support portion 56 and upper surfaces of the lead terminal connecting portions 44 (including the inwardly-narrowed narrow portions 49).

Figure 18:
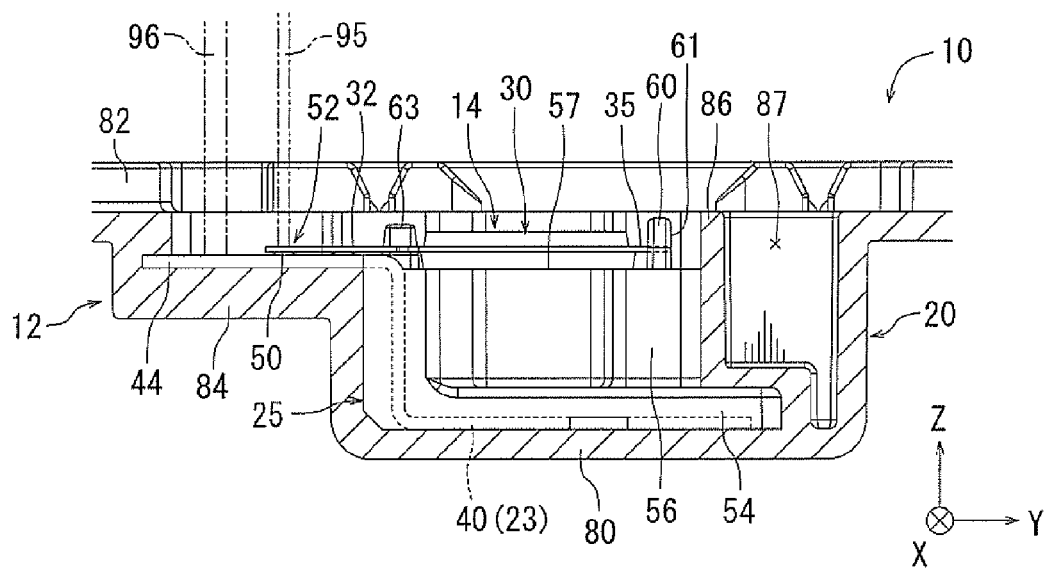
FIG. 18 is a partially enlarged longitudinal sectional view of FIG. 1.
Figure 19:
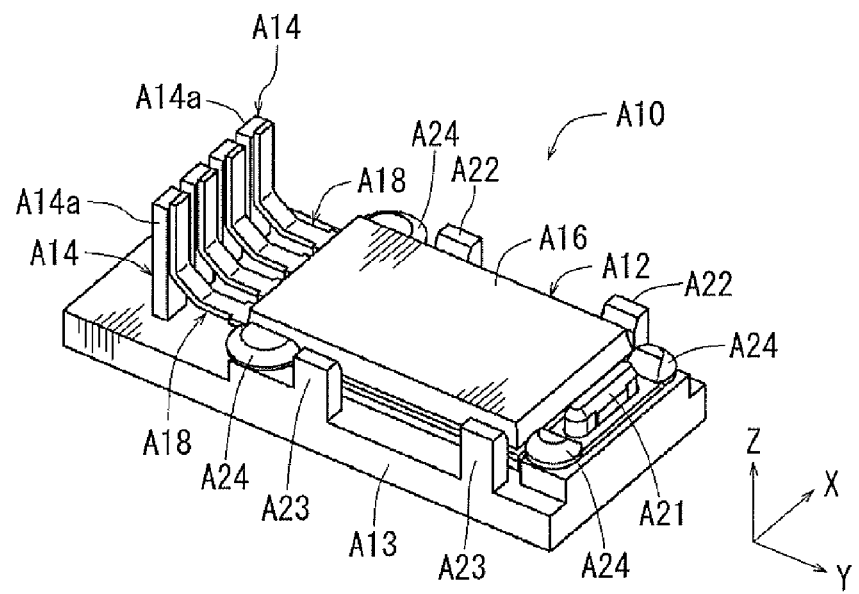
FIG. 19 is a perspective view of a conventional rotation angle detection device.

The distal end portions (the back end portions) of the lead terminal connecting portions 44 of the sensor terminals 23 may be embedded in the support wall portion 84 (FIG. 18). Further, as shown in FIGS. 2 and 14, the support wall portion 84 may have a plurality of (four in this embodiment) recessed portions 87 formed therein and opened upward (the positive direction of the Z-axis direction). The recessed portions 87 may be arranged along a left side and a front side of the support portion 56. Further, the recessed portions 87 may be separated from each other via dividing walls 88.

Figure 13:
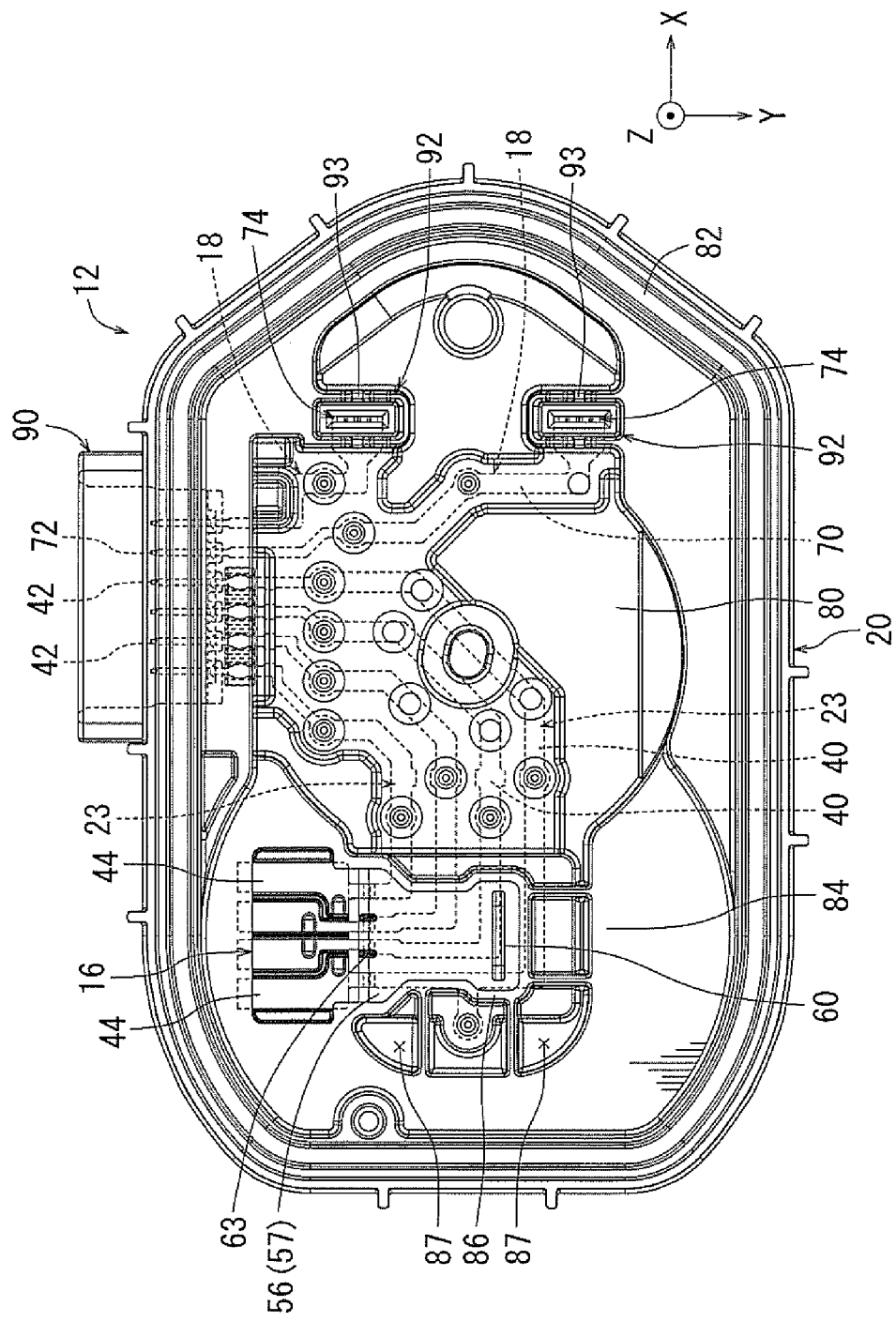
FIG. 13 is a plan view of the base.
Figure 15:
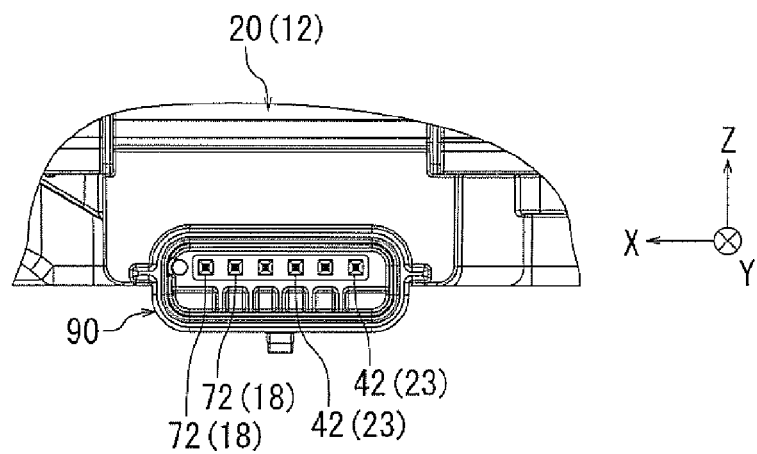
FIG. 15 is a partially side view of the base which shows a connector portion thereof.

As shown in FIGS. 13 and 15, the resin-molded member 20 may include a connector portion 90 that is formed in a back side lower portion thereof. As shown in FIG. 15, the connector portion 90 may have an oval or oblong bottomed cylindrical shape elongated in the lateral direction (the X-axis direction) and open backward (the negative direction of the Y-axis direction). As will be recognized, the external terminal connecting portions 42 of the sensor terminals 23 of the sensor holder 16 and the external terminal connecting portions 72 of the motor connecting terminals 18 (FIG. 3) may be projected into the connector portion 90. Further, as shown in FIG. 15, the external terminal connecting portions 42 and the external terminal connecting portions 72 may be positioned in parallel with each other in the lateral direction (the X-axis direction).

As shown in FIGS. 2 and 13, the resin-molded member 20 may include a pair of cylindrical portions 92 that are formed in a right end portion of the plate-shaped portion 80. The cylindrical portions 99 may respectively have a oval or oblong bottomed cylindrical shape that is elongated in the front-back direction (the Y-axis direction) and opens upward (the positive direction of the Z-axis direction). As will be recognized, the motor terminal connecting portions 74 of the motor connecting terminals 18 (FIG. 3) may respectively be positioned in the cylindrical portions 92. Further, as shown in FIG. 2, the cylindrical portions 92 may respectively have a pair of slots 93 that are formed in right and left walls thereof. The slots 93 may open on upper ends thereof. The slots 93 may preferably be laterally aligned with the expanding slots 75 of the motor terminal connecting portions 74.

Figure 17:
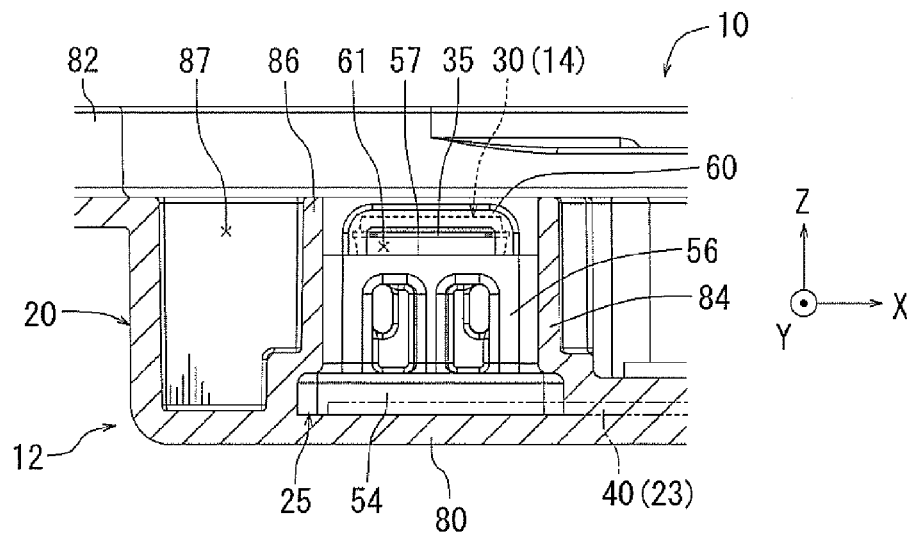
FIG. 17 is a partially enlarged transverse sectional view of FIG. 1.

As shown in FIG. 1, the sensor IC 14 may be attached to the base 12. Thus, the rotation angle detection device 10 may be formed. As shown in FIG. 18, the sensor IC 14 may be attached to the base 12 such that the sensor body 30 thereof is disposed on the attaching surface 57 formed in the support portion 56 contained in the base 12. That is, the sensor IC 14 may be attached to the base 12 such that the thickness direction of the sensor body 30 is aligned with the vertical direction (the Z-axis direction). Further, the sensor IC 14 may be attached to the base 12 such that the projection strip 35 formed in the sensor body 30 of the sensor IC 14 is slidably inserted into the engagement opening 61 of the positioning frame 60 formed in the attaching surface 57 (FIG. 17). That is, the sensor IC 14 may be attached to the base 12 such that the projection strip 35 (the sensor body 30) can slide in the front-back direction (the Y-axis direction). Thus, due to the positioning frame 60, the projection strip 35 may substantially be restrained in the lateral direction (the X-axis direction) and the vertical direction (the Z-axis direction) while being capable of moving in the front-back direction (the Y-axis direction).

Figure 16:
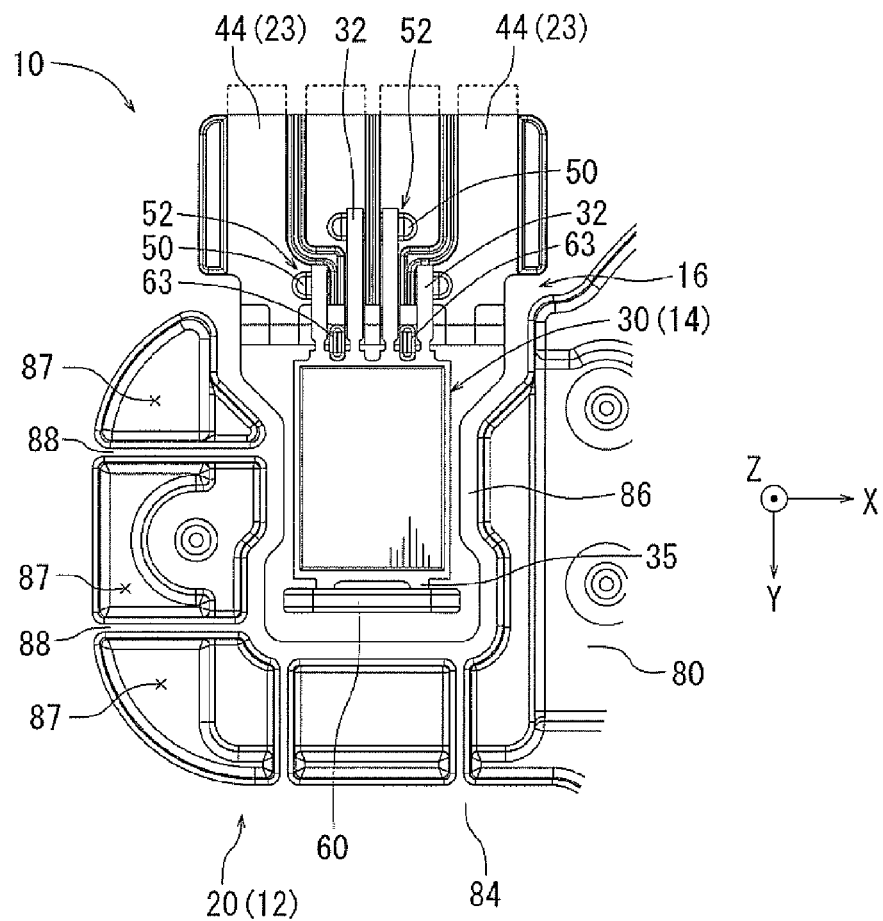
FIG. 16 is a partially enlarged plan view of FIG. 1.

Further, as shown in FIG. 16, the sensor IC 14 may be attached to the base 12 such that the positioning projections 63 formed in the attaching surface 57 are respectively positioned between the left two lead terminals 32 of the sensor IC 14 and between the right two lead terminals 32 of the sensor IC 14. Thus, due to the positioning projections 63, the left two lead terminals 32 and the right two lead terminals 32 of the sensor IC 14 may substantially be restrained in the lateral direction (the X-axis direction) while being capable of moving in the front-back direction (the Y-axis direction). This means that the sensor IC 14 (the sensor body 30) may be supported on the base 12 (the support member 25 of the sensor holder 16) while being capable of moving in the front-back direction (the Y-axis direction).

Further, as shown in FIG. 18, the sensor IC 14 may be attached to the base 12 such that the distal (back) end portions of the lead terminals 32 are laid or positioned on the lead terminal connecting portions 44 of the sensor terminals 23. In particular, the distal (back) end portions of the lead terminals 32 may be laid on the lead terminal connecting portions 44 so as to contact the projections 50 formed in the lead terminal connecting portions 44. Further, the distal (back) end portions of the lead terminals 32 may be bonded to the lead terminal connecting portions 44 (the projections 50) by a welding method, e.g., a resistance welding method. Further, the lead terminals 32 may preferably be welded to the lead terminal connecting portions 44 (the projections 50) such that the back end surface of the sensor body 30 of the sensor IC 14 contacts the positioning projections 63 formed in the attaching surface 57. Thus, the sensor body 30 can be appropriately positioned in the front-back direction (the Y-axis direction) by the positioning projections 63.

Preferably, the lead terminals 32 of the sensor IC 14 may be bonded to the lead terminal connecting portions 44 (the projections 50) from above (in the negative direction of the Z-axis direction) by a projection welding method. The projection welding method may preferably be an indirect projection welding method. In particular, as shown in FIG. 18, a positive (+) electrode 95 may be pressed against the distal (back) end portions of the lead terminals 32 while a negative (−) electrode 96 may be pressed against the lead terminal connecting portions 44 at a position that is separated from the positive electrode 95 in the negative direction of the Y-axis direction. Thereafter, an electric current may be applied between the electrodes 95 and 96, so that the lead terminals 32 may be bonded or welded to the lead terminal connecting portions 44 (the projections 50). However, a parallel gap welding method may be used instead of the indirect projection welding method. Further, the resistance welding method may be referred to as a bonding means or method.

As will be easily appreciated, a front end portion of the sensor body 30 of the sensor IC 14 can be effectively prevented from being lifted up during a welding operation because the projection strip 35 formed in the sensor body 30 engages the positioning frame 60.

Generally, a space inside the surrounding wall 86 formed in the support wall portion 84 of the resin-molded member 20 may be filled with a potting agent or a sealing compound in order to make the sensor IC 14 and the sensor terminals 23 waterproof and to prevent the sensor IC 14 from vibrating. Soft materials having low elasticity may preferably be used as the potting agent or the sealing compound.

As previously described, the rotation angle detection device 10 thus constructed may be attached to the throttle body (not shown) of the throttle valve control device (not shown). As shown in FIG. 12, when the rotation angle detection device 10 is attached to the throttle body, connecting terminals 100 (one of which is shown in FIG. 12) of the electric motor attached to the throttle body may be connected to the motor terminal connecting portions 74 of the motor connecting terminals 18. In particular, the connecting terminals 100 of the electric motor may be inserted between the clamping strips 76 of the motor terminal connecting portions 74 with the aid of elasticity of clamping strips 76. As a result, the connecting terminals 100 may be elastically clamped between the clamping projections 77 formed in the clamping strips 76, so as to be connected to the motor terminal connecting portions 74.

Further, the connecting terminals 100 of the electric motor may have a flat plate shape. The connecting terminals 100 may be positioned such that width directions thereof are perpendicular to the width directions of the motor terminal connecting portions 74. Further, the connecting terminals 100 may be configured such that right and left edges thereof fit in the slots 93 (FIG. 2) formed in the cylindrical portions 92 of the resin-molded member 20. Further, the rotation angle detection device 10 may be attached to the throttle body such that a detection center of the sensor body 30 of the sensor IC 14 is aligned with an axis of the throttle shaft contained in the throttle body.

In the rotation angle detection device 10 attached to the throttle body of the throttle valve control device, an external connector (not shown) connected to an electronic control unit (not shown) of the vehicle and an electric power source (not shown) may be connected to the connector portion 90 (FIG. 15) of the resin-molded member 20. The detection elements embedded in the sensor body 30 of the sensor IC 14 may be configured to detect changes of a magnetic field that is generated between a pair of permanent magnets attached to the throttle shaft contained in the throttle body. Conversely, the arithmetic elements embedded in the sensor body 30 may be configured to output signals representative of the changes of the magnetic field to the electronic control unit of the vehicle based upon detection signals from the detection elements. The electronic control unit may be configured to calculate a rotation angle of the throttle shaft based upon the signals from the arithmetic elements (arithmetic portion).

According to the rotation angle detection device 10, the lead terminals 32 of the sensor IC 14 may be laid on the lead terminal connecting portions 44 of the four sensor terminals 23 in the Z-axis direction and bonded thereto. However, the sensor body 30 of the sensor IC 14 may be supported on the holding member (in particular, the support member 25 of the sensor holder 16) while it is capable of relatively moving in the front-back direction (the Y-axis direction). That is, the sensor IC 14 may be immovably restrained in the support member 25 in the Y-axis direction only at the bonded portions or the welded portions 52 between the lead terminals 32 and the lead terminal connecting portions 44. When the support member 25 and the sensor IC 14 are elongated and contracted in the Y-axis direction by heat, the sensor body 30 of the sensor IC 14 can move relative to the support member 25 in the Y-axis direction. As a result, stresses applied to the lead terminals 32 of the sensor IC 14 can be prevented. That is, even when the support member 25 and the sensor IC 14 are elongated and contracted in the Y-axis direction by heat, a stress concentration in the lead terminals 32 of the sensor IC 14 can be minimized. Further, because the lead terminals 32 of the sensor IC 14 may be bonded to the lead terminal connecting portions 44 without being bent, the stress concentration therein can be further effectively reduced. As a result, a disconnection of the lead terminals 32 of the sensor IC 14 can be effectively prevented. This may lead to an increased reliability of the rotation angle detection device 10.

In addition, even when the support member 25 is elongated and contracted in the front-back direction (the Y-axis direction) by heat, the sensor IC 14 can be prevented from being positionally displaced, so that a detection accuracy of the sensor IC 14 can be prevented from being reduced. Further, because the lead terminals 32 of the sensor IC 14 may be bonded to the lead terminal connecting portions 44 without being bent, the rotation angle detection device 10 can be prevented from being increased in size.

Further, the distal end portions of the lead terminals 32 of the sensor IC 14 are bonded to the lead terminal connecting portions 44 of the sensor terminals 23 by the welding method, e.g., the resistance welding method (FIG. 18). In addition, the outer two lead terminals 32 may have a length different from a length of the inner two lead terminals 32 (FIG. 3). Therefore, when the lead terminals 32 of the sensor IC 14 are bonded to the lead terminal connecting portions 44 of the sensor terminals 23 by the welding method, a distance between the adjacent two welded portions 52 can be increased. As a result, a welding workability during the welding operation can be increased. Moreover, a poor welding caused by a short circuit can be prevented.

Further, the lead terminal connecting portions 44 of the four sensor terminals 23 may be configured to have a width greater than a width of other portions (i.e., the terminal body portions 40, the external terminal connecting portions 42, the vertical portions 43 and the narrowed portions 49) of the sensor terminals 23 (FIG. 4). Therefore, the lead terminal connecting portions 44 may have an increased heat dissipation efficiency and an increased resistance to current during the welding operation. This may lead to a reduced occurrence of poor welding. In addition, due to the increased heat dissipation efficiency, a heat accumulation in the lead terminal connecting portions 44 can be effectively reduced. This may lead to the welding workability during the welding operation.

According to the rotation angle detection device 10, the four sensor terminals 23 may be combined with the resin-molded component (the support member 25 and the resin-molded member 20) by the insert molding method. Therefore, the sensor terminals 23 can be appropriately positioned. Further, the support member 25 (the support portion 56) may have the attaching surface 57 formed thereon. Therefore, the sensor IC 14 (the sensor body 30) can be disposed on the attaching surface 57 of the support member 25 in the recumbent position from above (in the negative direction of the Z-axis direction).

Further, the support member 25 (the support portion 56) may have the positioning frame 60 that is configured to prevent the projection strip 35 of the sensor IC 14 from moving upward or in a direction away from the attaching surface 57 and in the lateral direction (the X-axis direction). Therefore, due to the attaching surface 57 and the positioning frame 60, the projection strip 35 of the sensor IC 14 can be restrained or positioned in the vertical direction perpendicular to the attaching surface 57 and in the lateral direction (the X-axis direction). As will be appreciated, the attaching surface 57 and the positioning frame 60 may be formed in the resin-molded member 20 instead of the support member 25 as described. Further, the shape of the positioning flame 60 is not limited to the inverted U-shape provided that the projection strip 35 of the sensor IC 14 can be restrained in the vertical direction (the Z-axis direction).

The two positioning projections 63 may be formed in the support member 25 (the support portion 56). The positioning projections 63 may be configured to prevent the two (right and left) pairs of lead terminals 32 of the sensor IC 14 from moving in a direction parallel to the attaching surface 57 and in the lateral direction perpendicular to the lead terminals 32. Therefore, the lead terminals 32 of the sensor IC 14 can be restrained or positioned in the lateral direction by the positioning projections 63. As will be recognized, the number of the positioning projections 63 may be one or three or more. Further, one of the positioning projections 63 may be configured to position one of the lead terminals 32 in one direction of the X-axis direction. Further, the positioning projections 63 may be formed in the resin-molded member 20 instead of the support member 25 as described.

The positioning projections 63 may act as stoppers that are capable of limiting the sensor body 30 of the sensor IC 14 from moving backward (the negative direction of the Y-axis direction). Therefore, the sensor body 30 can be appropriately positioned in the front-back direction (the Y-axis direction) by the positioning projections 63. As a result, there is no need to provide an additional member in order to appropriately position the sensor body 30 in the front-back direction.

Due to the positioning frame 60 and the positioning projections 63, the sensor IC 14 can be easily positioned. Further, the sensor IC 14 can be prevented from being displaced, so that a detection performance of the sensor IC 14 can be prevented from being decreased.

The resin-molded member 20 may include the surrounding wall 86 that surrounds the sensor IC 14. Therefore, the sensor IC 14 can be protected from damage caused by an external force. Further, the surrounding wall 86 may be formed in the support member 25 instead of the molded member 20 as described.

The resin-molded member 20 may include the recessed portions 87 that are positioned around the surrounding wall 86. The recessed portions 87 may effectively function to prevent formation of shrinkage in the resin-molded member 20. Therefore, the attaching surface 57 formed in the support member 25 may be prevented from being distorted. As a result, the sensor IC 14 can be accurately and stably attached to the support member 25. Further, the recessed portions 87 may contribute to an efficient heat dissipation of heat generated in the sensor IC 14. Further, the recessed portions 87 may be formed in the support member 25 instead of the molded member 20 as described.

Each of the motor terminal connecting portions 74 of the motor connecting terminals 18 may have the pair of clamping strips 76 that are configured to elastically clamp the connecting terminals 100 of the motor therebetween. The clamping strips 76 may be configured to be elastically flexed in the widthwise directions. Further, the clamping strips 76 may respectively be reduced in width toward the distal end portions thereof. Thus, the clamping strips 76 may elastically clamp the connecting terminals 100 therebetween. Further, the clamping strips 76 may generate a sufficient clamping force without being subjected to increased stress. Further, the clamping strips 76 may be prevented from being permanently set, so as to have a predetermined clamping force for an extended period of time.

The sensor terminals 23 may be produced in the form of the terminal blank 22 (the terminal unit) in which the sensor terminals 23 having the positioning holes 41 are integrated with each other via first to third tying portions 46, 47 and 48. The terminal blank 22 may be combined with the support member 25 by the insert molding method. Thereafter, the tying portions 46, 47 and 48 may be removed, so that the sensor holder 16 having the sensor terminals 23 may be formed. Therefore, the sensor terminals 23 can be accurately arranged with respect to the support member 25.

The sensor terminals 23 may be previously formed as the sensor holder 16 (the primary molded article) in which the sensor terminals 23 are integrated with each other via the support member 25. Therefore, the sensor terminals 23 can be accurately integrated with the resin-molded member 20 by simply positioning the sensor holder 16 on the molds (not shown) used in the secondary molding operation. As a result, a molding workability during the secondary molding operation can be increased. In addition, a productively of the base 12 (the secondary molded article) can be increased.

The support member 25 (the support portion 56) may have the hollow portions 65 and the through holes 66. The hollow portions 65 and the through holes 66 may effectively function to prevent formation of shrinkage in the support member 25. Therefore, the attaching surface 57 formed in the support member 25 may be prevented from being distorted. As a result, the sensor IC 14 can be accurately attached to the support member 25.

The left portions of the terminal body portions 40 of the sensor terminals 23 may be partially embedded in the support member 25, so as to extend along the lower surface of the support member 25 (FIG. 8). This may allow for compact arrangement of the sensor terminals 23. Further, the terminal body portions 40 of the sensor terminals 23 may effectively prevent a noise from below from transmitting to the sensor IC 14.

The sensor IC 14 and the motor connecting terminals 18 may be disposed on the resin-molded member 20 at regular intervals. Further, the central portions of the terminal body portions 40 of the sensor terminals 23 may be disposed on the plate-shaped portion 80 of the resin-molded member 20 between the sensor IC 14 and the motor connecting terminals 18 (FIGS. 1 and 13). Therefore, the plate-shaped portion 80 between the sensor IC 14 and the motor connecting terminals 18 may be prevented from being deformed or curved when it is elongated and contracted by heat.

Various changes and modifications may be made to the rotation angle detection device 10. For example, in the embodiment, the rotation angle detection device 10 is applied to the electronically-controlled throttle valve control device. However, the rotation angle detection device 10 may be applied to a mechanically-controlled throttle valve control device. Further, in the embodiment, the rotation angle detection device 10 is used in order to detect the rotation angle of the throttle shaft in the throttle valve control device. However, the rotation angle detection device 10 may be used in order to detect a rotation angle of a rotation member in an automatic transmission shift lever, an accelerator pedal or other such devices.

In the above described embodiment, the two-output type sensor is used as the sensor IC 14 (the magnetic detection member). However, the sensor IC 14 may be a one-output type sensor having a sensor body in which a sensing portion is connected to an arithmetic portion via conductive wires. Further, a Hall element, a Hall IC or other such elements may be used instead of the sensor IC 14.

In the above described embodiment, the support portion 56 is formed in the support member 25 of the sensor holder 16. However, the support portion 56 may be formed in the resin-molded member 20. Further, in the above described embodiment, the positioning frame 60 is configured to slidably receive the projection strip 35 of the sensor body 30 of the sensor IC 14. However, the positioning frame 60 is configured to slidably receive the whole sensor body 30. Further, the positioning projections 63 may respectively be configured to guide the sensor body 30 of the sensor IC 14 instead of the lead terminals 32. Further, the support portion 56 may have additional positioning members that are configured to position the sensor body 30 in a manner that the sensor body 30 can slide in the front-back direction (the Y-axis direction).

The lead terminals 32 of the sensor IC 14 may be bonded to the lead terminal connecting portions 44 of the sensor terminals 23 by a laser welding method, a soldering method, a bonding method using electrically-conducting adhesives, or other such methods instead of the resistance welding method. Further, when the laser welding method, the soldering method or the bonding method using the electrically-conducting adhesives is used, the lead terminals 32 may have the same length as each other.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A rotation angle detection device, comprising:
a magnetic detection member that is configured to detect a rotation angle of a rotation member;
a holding member holding the magnetic detection member; and
a plurality of wiring members for magnetic detection that are attached to the holding member and are connected to the magnetic detection member;
wherein the magnetic detection member includes a flat plate-shaped body portion, and a plurality of lead terminals that are longitudinally linearly projected from one end portion of the body portion in parallel over the entire length thereof;
wherein the body portion of the magnetic detection member is slidably attached to the holding member in a manner that the body portion can longitudinally slide relative to the holding member;
wherein the wiring members for magnetic detection respectively have lead terminal connecting portions that linearly extend over their entire length and in the same direction as and parallel to the lead terminals of the magnetic detection member; and
wherein the lead terminals of the magnetic detection member are laid on the lead terminal connecting portions of the wiring members for magnetic detection and bonded thereto.

2. The rotation angle detection device as defined in claim 1, wherein the lead terminals of the magnetic detection member are bonded to the lead terminal connecting portions of the wiring members for magnetic detection at distal end portions thereof by a resistance welding method, and wherein at least one of the lead terminals has a length different from a length of the remaining lead terminals and is bonded to the corresponding lead terminal connecting portion at a longitudinal position different from the remaining lead terminals.

3. The rotation angle detection device as defined in claim 1, wherein the lead terminal connecting portions of the wiring members for magnetic detection have a width greater than a width of other portions of the wiring members for magnetic detection.

4. The rotation angle detection device as defined in claim 1, wherein the holding member has a resin-molded component molded with the wiring members for magnetic detection, and wherein the resin-molded component has an attaching surface on which the body portion of the magnetic detection member is disposed.

5. The rotation angle detection device as defined in claim 4, wherein the resin-molded component has a first positioning portion that is configured to position the other end portion of the body portion of the magnetic detection member in a direction away from the attaching surface of the resin-molded component.

6. The rotation angle detection device as defined in claim 5, wherein the resin-molded component has a surrounding wall that surrounds the magnetic detection member.

7. The rotation angle detection device as defined in claim 6, wherein the resin-molded component has recessed portions that are positioned around the surrounding wall.

8. The rotation angle detection device as defined in claim 4, wherein the resin-molded component has a second positioning portion that is configured to position at least one of the lead terminals of the magnetic detection member in directions parallel to the attaching surface and perpendicular to the lead terminals.

9. The rotation angle detection device as defined in claim 5, wherein the first positioning portion has an engagement opening into which the other end portion of the body portion of the magnetic detection member is longitudinally slidably received.

10. The rotation angle detection device as defined in claim 1, further comprising actuator connection wiring members having actuator terminal connecting portions, wherein the actuator terminal connecting portions respectively have a pair of flat plate-shaped elastic clamping strips that are configured to elastically clamp actuator terminals therebetween, and wherein the elastic clamping strips are configured to be elastically flexed in their widthwise directions and reduced in width toward distal end portions thereof.

* * * * *